United States Patent [19]

Belitskaya et al.

[11] 3,852,622

[45] Dec. 3, 1974

[54] MONOSTABLE MULTIVIBRATOR CONTROLLED BY A TRAIN OF SIGNALS OF A DIFFERENT POLARITY

[76] Inventors: Marina Sergeevna Belitskaya, Ploschad Iskusstv, 5, kv. 38; Lev Nikolaevich Volkov, prospekt Engelsa, 7, kv. 181, both of Leningrad, U.S.S.R.

[22] Filed: Mar. 21, 1973

[21] Appl. No.: 343,380

Related U.S. Application Data

[63] Continuation of Ser. No. 114,118, Feb. 10, 1971, abandoned.

[52] U.S. Cl. .................. 307/273, 328/207

[51] Int. Cl. .................. H03k 3/10

[58] Field of Search .................. 307/273; 328/207

[56] References Cited

UNITED STATES PATENTS

| | | | |
|---|---|---|---|
| 2,530,033 | 11/1950 | Scoles | 328/207 |
| 2,567,851 | 9/1951 | Lipkin | 328/207 |
| 3,315,099 | 4/1967 | Nishioka | 307/273 |
| 3,382,375 | 5/1968 | Dischert | 307/273 |
| 3,389,273 | 6/1968 | Haines | 307/310 |
| 3,419,735 | 12/1968 | Seer, Jr. et al. | 307/273 |

*Primary Examiner*—Stanley D. Miller, Jr.
*Attorney, Agent, or Firm*—Holman & Stern

[57] ABSTRACT

A monostable multivibrator having two transistors whose emitters are connected to the common junction of the multivibrator. A capacitor is placed between the base of the first transistor and the collector of the second transistor, and a resistor is placed between the base of the first transistor and the common junction of the multivibrator.

1 Claim, 2 Drawing Figures

MONOSTABLE MULTIVIBRATOR CONTROLLED BY A TRAIN OF SIGNALS OF A DIFFERENT POLARITY

This is a continuation of application Ser. No. 114,118, filed Feb. 10, 1971 and now abandoned.

BACKGROUND OF THE INVENTION

The present invention relates to monostable multivibrators and may be used in digital measuring instruments.

Known in the art are monostable multivibrators having two transistors whose emitters are connected to a common junction (see, for example, West German Pat. No 1,062,279, Class 21*a*, $36_{18}$).

These multivibrators are driven from their original stable state to their quasi-stable state by an external signal of one polarity, while a return to the steady state occurs automatically after a time decided by the parameters of the multivibrator circuit. Since the parameters of the multivibrator circuit are anything but constant and may be affected by external factors, the instant at which the multivibrator returns to its original steady state may vary. Therefore, the start of the output pulses in the prior-art monostable multivibrators is fixed in time, while their termination is not. This property of the prior-art monostable multivibrators prevents them from being used in applications where the start and termination of a cycle must be fixed in time, for example, in digital measuring instruments.

SUMMARY OF THE INVENTION

The object of the present invention is to provide a monostable multivibrator the output pulses of which have their start and termination fixed in time and adjustable within broad limits, which will ensure the requisite scaling down of the repetition rate of the input pulse of the multivibrator. Such a multivibrator may be used in, for example, the control units of digital instruments and will enable these instruments to dispense with complicated automatic-control units using a large number of transistors.

With this object in view, the present invention resides in a monostable multivibrator having two transistors whose emitters are connected directly to the common junction of the multivibrator wherein, according to the invention, a capacitor is placed between the base of the first transistor and the collector of the second transistor, and a resistor is placed between the base of the first transistor and the common junction of the multivibrator.

It is preferable to place a second capacitor between the collector of the second transistor and the common junction of the multivibrator.

BRIEF DESCRIPTION OF THE INVENTION

The invention will be more fully understood from the following description of a preferred embodiment when read in connection with the accompanying drawings wherein:

FIG. 1 is a circuit schematic diagram of a monostable multivibrator according to the invention;

FIG. 2 *a*, *b*, *c*, and *d* are voltage waveforms explaining operation of a monstable multivibrator according to the invention.

DETAILED DESCRIPTION OF THE PREFERRED EMBODIMENTS

Figure 1:
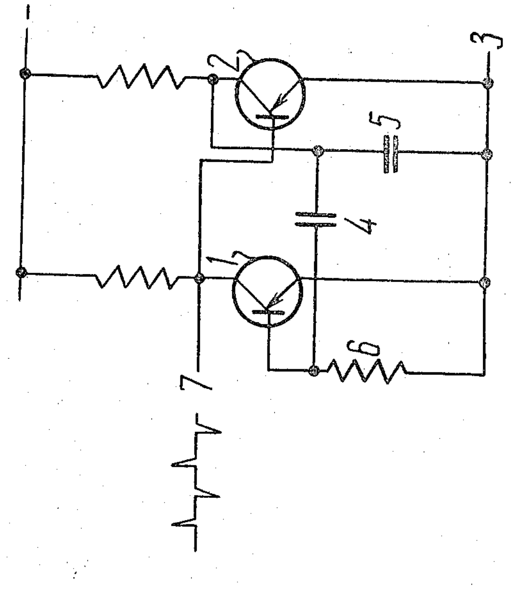

Referring to FIG. 1, a monostable multivibrator is shown having two transistors 1 and 2 whose emitters are connected directly to the common junction 3 of the multivibrator.

Connected to the base of the transistor 1 is a chain of two capacitors 4 and 5 the common junction of which is connected to the collector of the transistor 2. Placed between the base of the transistor 1 and the common junction 3 in a resistor 6. The multivibrator is triggered by a signal applied to a bus 7.

Figure 2:
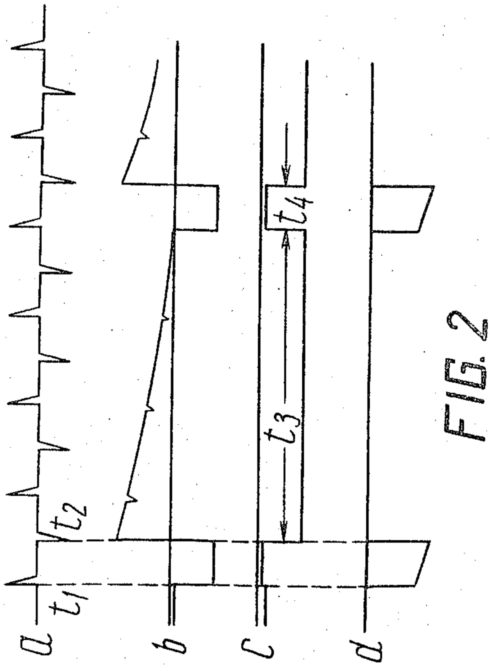

The monostable multivibrator disclosed herein operates as follows:

The bus 7 accepts a train of positive and negative pulses (FIG. 2*a*). Normally, under static conditions before application of the input trigger signal, the transistor 1 is non-conductive while transistor 2 is ON (conducting), and this will be defined as the static stable state of the circuit. In this stable state, the collector of transistor 1 has a negative direct voltage of 0.3 to 0.35 V equal to the base-emitter junction voltage of the conductive transistor 2 while the collector of transistor 2 has the voltage of 0.03 to 0.035 V. A positive pulse applied to the base of the transistor 2 drives it to cut-off (turns it OFF), and the negative voltage at its collector rises. As a result, the capacitor 4 charges via the resistor 6 across which a negative voltage drop is produced with respect to the common point 3 and passed to the base of the transistor 1 (time $t_1$ in FIG. 2*b*). In the meantime, the transistor 1 is conductive and remains in the state until a negative pulse arrives at the base of the transistor 2. The negative pulse turns the transistor 2 ON, the circuit of the capacitor 4 is shorted, and it begins to discharge through the resistor 6 and the transistor 2. As a result, the voltage drop across the resistor 6 reverses its polarity, and the base of the transistor 1 acquires a positive voltage (time $t_2$ in FIG. 2*b*), which drives the transistor 1 to cut-off (turns it OFF). At the same time, the negative voltage at the collector of the transistor 1 rises (FIG. 2*c*) and is passed to the base of the transistor 2, thereby holding in the "ON" (conducting) state (the voltage at the collector of the transistor 2, FIG. 2*d*).

After time $t_2$, the capacitor 4 begins to discharge exponentially (FIG. 2*b*), while the positive pulses continually arriving at the base of the transistor 2 give rise to negative pulses at its collector. These negative pulses are passed to the base of the transistor 1 via the capacitor 4. However, because of the presence of the capacitor 5, the amplitude of the negative pulses at the collector of the transistor 2 is markedly reduced, and their effect on the positive voltage at the base of the transistor 1 is not practically felt until their amplitude exceeds somewhat the voltage at the base of the transistor 1. At that instant, the base of the transistor 1 acquires a negative voltage, the transistor jumps into conduction, the voltage at the base of the transistor 2 drops practically to zero, and the transistor 2 jumps to the OFF state. This sequence of events occurs at a very high rate, resulting in a rapid rise of the negative voltage at the base of the transistor 1 accompanied by the charging of the capacitor 4 and the return of the multivibrator to the original stable state. When another negative pulse arrives at the collector of the transistor 2, the sequence of events just described is repeated all over again.

Thus, the multivibrator disclosed herein, in contrast to any of the prior-art devices intended for pulse-stretching, is controlled by two pulses of opposite polarity so that a positive pulse drives the circuit to the original stable state in which it resides until arrival of a negative pulse which controls operation of the multivibrator. Accordingly, the multivibrator disclosed herein has two operational states as follows:

*a.* The quiescent stable state in which the circuit is ready to operate. The duration $t_4$ of this state is decided by the repetition rate of the input pulses. During this interval, the transistor 1 is ON (conducting) and the transistor 2 is OFF (non-conducting).

*b.* The quasi-stable state during which the transistor 1 is OFF (non-conducting) and the transistor 2 is ON (conducting). The duration $t_3$ of this state is decided by the resistance of the resistor 6 and the capacitances of the capacitors 4 and 5.

By varying these circuit parameters, it possible to control the ratio $t_3/t_4$ within fairly broad limits (from 2:1 to 1,000:1).

If the invention is used in a digital apparatus in which the beginning of the measurement of a quantity coincides in time with one of the negative input pulses of the multivibrator (FIG. 2*a*), the onset of the "ON" (conducting) state for the transistor 2 will precisely be coincident with the beginning of the measurement, that is, with the beginning of a count. The termination of the conducting (ON) state for this transistor, coincident with one of the positive input pulses, may precisely be timed as required. This enables the present invention to be utilized as follows.

1. The positive derivative of the output pulses of the multivibrator (time $t_2$ in FIG. 2*d*) is coincident with the beginning of the count and so it may be utilized to control a measuring element, say, a measuring flip-flop.
2. The negative derivative of the output pulses (time $t_1$, FIG. 2*d*) which follows the positive derivative some time later and corresponds to the onset of the original stable state of the multivibrator, may be utilized to produce a "reset" pulse for counting decades, thereby making them ready for a new count.
3. With the positive and negative derivatives of the output pulses utilized as outlined above, the time which elapses between the generation of these derivatives, that is, the interval $t_3$, determines the time which can be used to indicate the results registered by the counting decades.
4. At the same time, the period for the quantization of the sought quantity is specified. This period corresponds to one measurement during the interval $t_3 - t_4$. The duration of the quantization period may be set (that is, the rate of measurement can be increased or decreased) by varying the resistance of the resistor 6. This will be accompanied by an automatic change in the time used to indicate the results of measurement, which will always remain longer than the qunatization period ($t_3 + t_4 > t_3$).
5. The negative voltage at the collector of the transistor 1 (FIG. 2*c*) blocks the transistor 2 during a time interval corresponding to the interval $t_3$ and thus keeps any stray noise out of it and, as a consequence, out of the measuring element.

From the above description it also follows that the monostable (one-shot) multivibrator disclosed herein can be used to scale down the number of pulses, with the ratio $T/(t_3 + t_4)$, where T is the period of the input pulses to the multivibrator, being varied within broad limits, according to the chosen parameters of the multivibrator circuit.

What is claimed is:

1. A monostable multivibrator controlled by a train of positive and negative input pulses, said multivibrator comprising a first and second transistor; a capacitor connected between the base of said first transistor and the collector of said second transistor; a common junction with the emitters of said transistors being directly connected thereto; a second capacitor connected between the collector of said second transistor and said common junction; a resistor connected between the base of said first transistor and said common junction; and conductor means coupled to the collector of said first transistor and the base of said second transistor for receiving the train of positive and negative input pulses, whereby output pulses from said multivibrator have their start and termination adjustably fixed in time and synchronized with various ones of the train of input pulses.

* * * * *